United States Patent
Johnston et al.

(10) Patent No.: US 9,940,113 B2
(45) Date of Patent: Apr. 10, 2018

(54) BIG DATA ASSISTANT (71) Applicant: International Business Machines Corporation, Armonk, NY (US)

(72) Inventors: James D. Johnston, Wappingers Falls, NY (US); Ruiping Li, Cupertino, CA (US); Sachin P. Sant, Bangalore (IN); Yefim Shuf, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/848,484

(22) Filed: Sep. 9, 2015

(65) Prior Publication Data
US 2017/0068525 A1    Mar. 9, 2017

(51) Int. Cl.
*G06F 9/445* (2006.01)
*G06F 9/44* (2018.01)
*G06F 21/60* (2013.01)
*G09G 5/00* (2006.01)
*H04L 29/06* (2006.01)
*H04L 7/00* (2006.01)
(Continued)

(52) U.S. Cl.
CPC .............. *G06F 8/60* (2013.01); *G06F 8/36* (2013.01); *G06F 21/60* (2013.01); *G06F 17/30289* (2013.01); *G09G 5/006* (2013.01); *H04L 7/0008* (2013.01); *H04L 25/49* (2013.01); *H04L 63/0227* (2013.01); *H04L 63/0263* (2013.01); *H04L 63/08* (2013.01)

(58) Field of Classification Search
CPC .............. G06F 21/60; G06F 21/6227; G06F 17/30289; G06F 17/30424; G06F 17/30448; G06F 8/36; G06F 8/60; H04L 7/0008; H04L 25/49; H04L 25/4908; H04L 63/0227; H04L 63/0263; H04L 63/08; G09G 5/006
USPC .................. 717/107; 707/714, 796; 709/223
See application file for complete search history.

(56) References Cited

U.S. PATENT DOCUMENTS 8,874,600 B2    10/2014  Gupta et al.
2004/0015833 A1*  1/2004  Dellarocas ............... G06F 8/20
                                                                 717/106
(Continued)

OTHER PUBLICATIONS

Malcolm, Rohan et al., "Increasing the Accessibility to Big Data Systems Via a Common Services API," 2014 IEEE International Conference on Big Data (Big Data), pp. 883-892, IEEE, 2014.

*Primary Examiner* — Wei Zhen
*Assistant Examiner* — Mohammed Huda
(74) *Attorney, Agent, or Firm* — Patterson + Sheridan, LLP (57) ABSTRACT

Embodiments disclosed herein generally relate to techniques for managing processing of data in computing systems. One embodiment provides a method which includes receiving a set of inputs to apply to at least a first big data definition. Each big data definition encapsulates information specified in the set of inputs into a set of reusable software components. The method also includes generating, based on the reusable software components, a first executable code component for the at least first big data definition. The method further includes deploying the first executable code component to an executing application without interrupting services provided by the executing application to which the first executable code component is deployed.

20 Claims, 7 Drawing Sheets (51) Int. Cl.
G06F 17/30 (2006.01)
H04L 25/49 (2006.01)

(56) References Cited

U.S. PATENT DOCUMENTS

| | | | |
|---|---|---|---|
| 2014/0032759 A1* | 1/2014 | Barton | H04L 67/10 |
| | | | 709/225 |
| 2014/0059017 A1 | 2/2014 | Chaney et al. | |
| 2014/0237554 A1* | 8/2014 | Narayanan | G06F 21/6227 |
| | | | 726/4 |

* cited by examiner

BIG DATA ASSISTANT

BACKGROUND

The present disclosure relates to techniques for managing data in computing systems, and more specifically, to techniques for orchestrating data into definitions to aid processing of large data sets in computing systems.

Today, many industries rely on high-end computing systems, such as mainframes, etc., to process high volume data, support transaction-driven applications, and run their most critical processes. Examples of such industries include those in banking, finance, health care, insurance, public utilities, government, and a multitude of other public and private enterprises. In general, these computing systems are capable of performing large-scale transaction processing (e.g., thousands of transactions per second, etc.), supporting thousands of users and application programs, managing large amounts of information stored in databases, handling large-bandwidth communication, etc.

Most workloads on these high-end computing systems generally fall into one of two categories: batch processing or on-line processing. Batch processing, in general, refers to the execution of a number of jobs (or workloads) on the computing system without user interaction. Typically, with batch processing, high volumes of data are collected, stored for a period of time, and subsequently processed at a later time period without any intervention from a user. Examples of batch processing jobs include payroll and billing systems, updating inventory systems, scheduled database backups and the like. On-line processing, on the other hand, generally refers to processing that occurs interactively with a user. For example, on-line processing is typically characterized by high volume short interactions between several (e.g., thousands) users and the computing system, with an immediate (real-time) response generally required for each interaction. Examples of on-line processing include automated teller machine (ATM) transactions (e.g., deposits, withdrawals, inquiries, transfers, etc.), debit/credit card payments, airline reservation systems, inventory control and production scheduling, etc.

Due, in part, to the explosion in both the amount of data used in computing systems and in the amount of applications that perform analytics (processing) on the data, computing systems have faced challenges with providing real time data processing and analytics. Accordingly, there is a need for improved techniques for processing large volumes of data within these computing systems.

SUMMARY

One embodiment presented herein describes a method for orchestrating a collection of big data definitions used to build executable code for a high-performance computing application. The method generally includes receiving a set of inputs to apply to at least a first big data definition, wherein each big data definition encapsulates information specified in the set of inputs into a set of reusable software components. The method also includes generating, based on the set of reusable software components, a first executable code component for the at least first big data definition. The method further includes deploying the first executable code component to an executing application without interrupting or suspending services provided by the executing application to which the first executable code component is deployed.

Another embodiment includes a system having a processor and a memory storing a program, which, when executed on the processor, performs an operation for orchestrating a collection of big data definitions used to build executable code for a high-performance computing application. The operation includes receiving a set of inputs to apply to at least a first big data definition, wherein each big data definition encapsulates information specified in the set of inputs into a set of reusable software components. The operation also includes generating, based on the set of reusable software components, a first executable code component for the at least first big data definition. The operation further includes deploying the first executable code component to an executing application without interrupting or suspending services provided by the executing application to which the first executable code component is deployed.

Still another embodiment includes a computer-readable storage medium storing instructions, which, when executed on a processor, performs an operation for orchestrating a collection of big data definitions used to build executable code for a high-performance computing application. The operation includes receiving a set of inputs to apply to at least a first big data definition, wherein each big data definition encapsulates information specified in the set of inputs into a set of reusable software components. The operation also includes generating, based on the set of reusable software components, a first executable code component for the at least first big data definition. The operation further includes deploying the first executable code component to an executing application without interrupting or suspending services provided by the executing application to which the first executable code component is deployed.

DETAILED DESCRIPTION

Transactions processed by many computing systems are becoming increasingly data-intensive. In a given transaction, for example, the computing system may have to process large volumes of data (e.g., typically terabytes, petabytes, etc. in size), which can involve transferring the data between several applications, intensive analytic processing, etc. Embodiments presented herein describe techniques to aid processing of big data (e.g., large data sets) in a computing system. More specifically, embodiments presented herein provide techniques for orchestrating a collection of big data definitions that can be used by one or more applications, within a computing system, to perform data-intensive processing (e.g., such as big data processing).

In one embodiment, the computing system receives a set of inputs to apply to at least one big data (metadata) definition. The set of inputs include metadata that specifies one or more additional inputs, outputs, processing operations (e.g., for performing analytics), data mappings, data formats, labels, memory constructs (e.g., the resources to be used for the big data definition), etc. Each big data definition encapsulates all of the information (or metadata) specified from the set of inputs into a set of reusable software components. In one embodiment, the computing system generates an executable code component (based on the set of reusable software components) for each big data definition created. The computing system then deploys each generated executable code component to an executing application without interrupting or suspending services provided by the executing application to which the executable code component is deployed.

As used herein, "big data" may refer to data that is characterized, in part, by large volume (e.g., terabytes, petabytes, etc. in size), large variety (e.g., including structured data, unstructured data, etc.), different sources, etc. Examples of big data information include banking information, travel information, medical records, geographical information, etc.

For many transactions, the big data processing (or analytics) associated with the transactions typically spans across different applications, computing systems, and networks. Performing analytics in this manner, however, provides challenges when performing real time processing. As a reference example, performing analytics (such as fraud detection) for thousands of credit card transactions generally requires several pieces of processing information (which includes the raw information and transformations (processing) on the raw information) located across different applications and/or computing systems. To process this information, current systems typically rely on batch processing or post processing tools. For example, these systems typically rely on pushing the data off to other computing systems (or machines, such as data accelerators) to do the intensive processing work, heavy input/output (I/O) work, analytics and other big data processing. Once the processing is completed, the results (post-process data) are either pushed back into the system of record, or the transaction application code (e.g., for processing credit card transactions) is updated to account for the results. These batch processing tools, however, are insufficient at providing real-time big-data processing for transactions. For example, batch processing generally leads to quality of service issues, which can include long response times and/or processing transactions with outdated information.

Further, in some cases, there may be new or different types of information that may be relevant to the processing of a given transaction. In current approaches to big data processing, however, systems generally cannot account for such information in the processing of the transaction (e.g., if the application was not designed to account for such information), unless a new application is designed or extensive modifications are made to the existing transactional application. Referring again to processing of credit card transactions as a reference example, in some cases, there can be different types of information (e.g., social media anomalies determined from a social media application, facial recognition information from a surveillance system application, and other information) that can affect fraud detection processing and, in turn, the processing of the credit card transaction by the transaction application. However, the social media information and/or the surveillance information would not be able to influence the fraud detection processing for the credit card transaction, unless the application responsible for processing the credit card transaction was designed to take this information into account. Moreover, even in cases where modifications could be made to existing applications and/or new applications designed to account for such information, the process would be cost-prohibitive and time-consuming. For example, the application development process generally requires several iterations of code changes and compilation, application builds, and unit testing, all of which cause long service interruptions to applications.

Embodiments presented herein provide improved techniques to aid real-time processing of big-data in computing systems. As described in more detail below, techniques presented herein can provide a composable view of all the data at rest and in motion, via big data definitions, which a user can create through a user interface. Using the techniques presented herein, the real-time big data processing can be broken into re-usable software components (e.g., operations/functions) whose output can be made available to other big definitions as input. Additionally, the techniques presented herein can be used to automatically generate code for the big data definitions, which allows computing systems to deploy (and undeploy) big data definitions to applications without service interruption, the ability to change user designated parameters (e.g., parameters that control resources, analytic parameters, thresholds, etc.) in real-time, etc.

Note that, in the following description, many of the following embodiments use the processing of credit card transactions as a reference example of a case where the data-intensive (big-data) processing generally associated with these transactions can be significantly improved (compared to traditional methods) using the techniques presented herein. Note, however, that the techniques presented herein can also be applied to other types of transactions, such as, for example, travel reservation systems, mobile transactions, and other real-time transactions as well as batch transactions such as in transactional batch jobs (e.g., performing a set of money transfers requested by bank customers, etc.). Such transactional batch jobs are commonly scheduled to run several times a day and at night.

Figure 1:
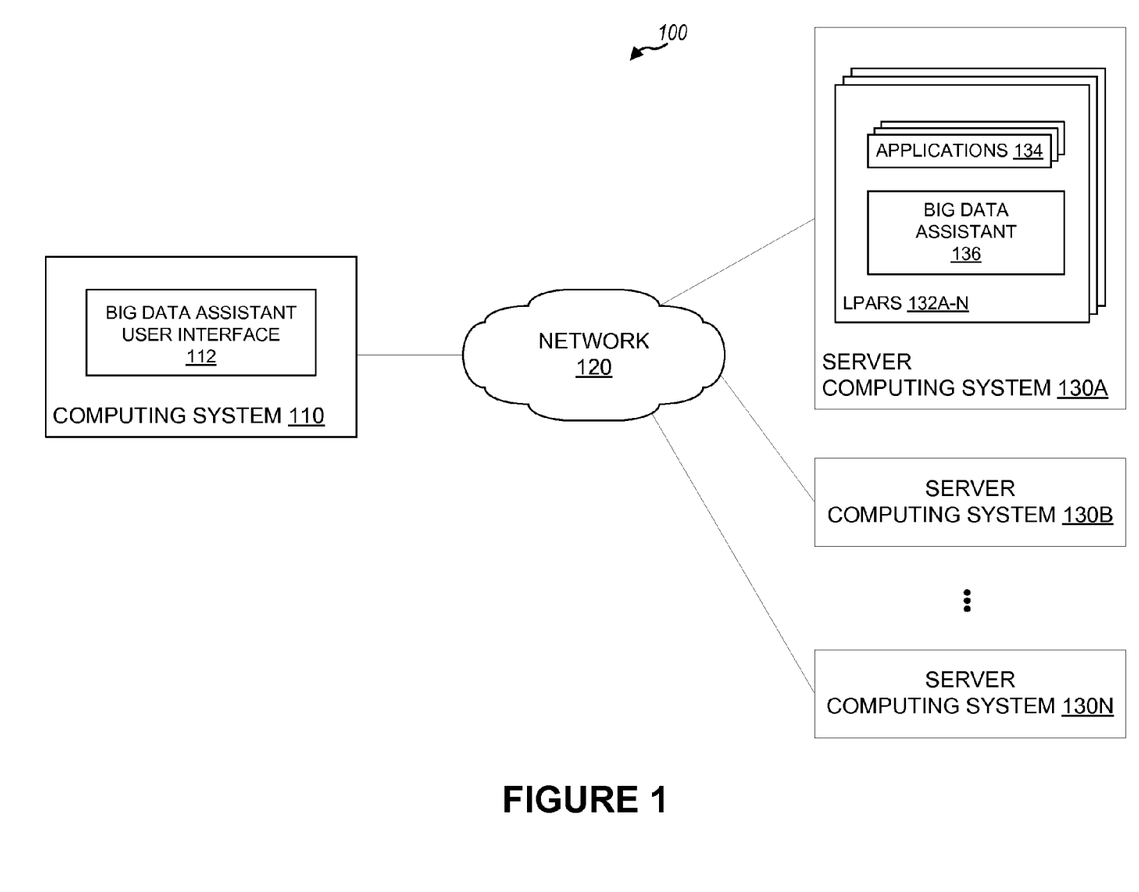
FIG. 1 illustrates an example computing environment, according to one embodiment.

FIG. 1 illustrates an example computing environment 100, according to one embodiment. As shown, the computing environment 100 includes a computing system 110 connected via the network 120 to a plurality of server computing systems 130A-N. In general, the network 120 may be a wide area network (WAN), local area network (LAN), wireless LAN (WLAN), etc. In one embodiment, the computing system 110 can be any kind of physical computing system having a network interface, such as a desktop computer, laptop computer, mobile device, tablet computer, and the like. The computing system 110 can access (or share), via the network 120, resources hosted on one or more logical partitions (or virtual machines) 132A-N within each server computing system 130A-N.

As shown, the computing system 110 provides a Big Data Assistant (BDA) user interface 112, which allows users to interact with the server computing systems 130A-N. The BDA user interface 112 can be any type of interface (e.g., such as a command line interface, text-based interface, graphical user interface (GUI), etc.) that allows a user to interact with the server computing systems 130A-N. In this particular embodiment, the BDA user interface 112 is a GUI written in JavaScript (e.g., using a JavaScript toolkit, such as Dojo, etc.). However, in other embodiments, the BDA user interface 112 can be implemented with other programming languages. Similarly, the BDA user interface 112 can be implemented as a webpage, browser extension, plugin or library.

The server computing systems 130A-N can receive workloads from one or more users and perform processing (e.g., batch processing, on-line transaction processing, etc.), via applications 134, for the workloads. In one embodiment, each of the server computing systems 130A-N is a mainframe computing system, an example of which includes any of the versions of the systems from the IBM® zSeries® family. Further, each of the server computing systems 130A-N, in general, operates under the control of an operating system. Examples of operating systems include distributions of Unix®, versions of IBM® mainframe operating systems (e.g., z/OS®, z/VM®, z/VSE®, z/TPF®, etc.), distributions of Linux®, and so on.

Each server computing system 130A-N can be partitioned into one or more logical partitions 132A-N, each of which represents a separate logical computing system (or server). The resources (e.g., processors, memory, input/output (I/O) devices) of each server computing system 130A-N can be divided or shared among the logical partitions 132A-N. Additionally, each logical partition 132A-N supports an independent operating system, which can be the same or different from another logical partition's operating system.

As shown, each server computing system 130A-N includes a plurality of applications 134 distributed across one or more of the logical partitions 132A-N. The applications 134 are generally configured to process transactions submitted to the server computing systems 130A-N. A transaction generally refers to an exchange of information (e.g., data or analysis of data, usually in the form of a request and a response) between one or more entities. Transactions can occur in a wide variety of different scenarios and/or environments, including, but not limited to, those in banking/finance, travel, telecommunications, and others. In some cases, a plurality of applications 134 may be used to process a given transaction. For example, as described below using one reference example in FIG. 5, in one embodiment, once a server computing system receives a request to process a credit card transaction, the applications 134 used to process the credit card transaction can include a (legacy) transaction application, social media application, fraud detection application, etc. Additionally, as mentioned above, in some cases, the on-line transaction processing (e.g., by the applications 134) can be a data-intensive process, such that providing real-time processing of the transaction, using traditional techniques, is inefficient and time-consuming.

The techniques presented herein allow a user to create, via the BDA user interface 112, one or more big data definitions. Each big data definition encapsulates metadata (e.g., inputs, outputs, processing operations (and the inputs, outputs, etc., for the operations), data mappings, data format, labels, memory constructs, references to other big data definitions, etc.) received from the user into a set of re-usable software components. In one embodiment, the memory constructs specified in a big data definition can be language specific and/or operating system (OS) specific, which allows code for OS specific high performing constructs to be generated. Once a user creates the big data definitions, the big data definitions can be stored in any database (e.g., such as an Oracle® database, etc.) that is accessible from the computing system 110 and/or server computing systems 130A-N.

The computing system 110 can access the database to fetch information as needed to create, modify and/or delete big data definitions.

As also shown, each server computing system 130A-N also includes a BDA tool 136, which performs the techniques presented herein. For example, as described below, the BDA tool 136 is configured to aid applications 134 in performing big data processing of transactions. In one embodiment, the BDA tool 136 is implemented within one of the logical partitions 132A-N as a server (e.g., a web application server (WAS), etc.). Some examples of WASs include versions of the IBM® Websphere Application Server and other servers compliant with Java Platform, Enterprise Edition (Java EE or J2EE).

In one embodiment, once a user creates the big data definitions, the BDA user interface 112 makes the big data definitions available to the BDA tool 136. The BDA user interface 112 communicates with the BDA tool 136 using Representational State Transfer (REST), which, in general, is a stateless, client-server, cacheable communications protocol. One example of a REST protocol is the hypertext transfer protocol (HTTP). Note, however, that the BDA user interface 112, in general, can communicate with the BDA tool 136 using other communication protocols.

The BDA tool 136 orchestrates the big data definitions (or the re-usable software components) and makes them accessible to the applications 134. The re-usable software components break down the big data processing (data-intensive processing) associated with a given transaction, which allows the applications 134 to perform big data processing in real-time. In addition, the BDA tool 136 uses the re-usable software components to automatically generate executable code for the applications 134, such that the big data definitions can be deployed to (or undeployed from) the applications 134 without interrupting or suspending services provided by the applications 134.

Note, however, that FIG. 1 illustrates merely one possible arrangement of the computing environment 100. More generally, one of ordinary skill in the art will recognize that other embodiments of computing systems can also be configured to implement real-time big data processing in accordance with the techniques presented herein. For example, in another embodiment, instead of a user using the BDA user interface 112 to interact with the BDA tool 136, the user could pre-populate one or more configuration files (within the computing system 110) with the same information (that would have been inputted via the BDA user interface 112). The BDA tool 136 could then use the information the configuration files to create and deploy executable code components to the applications 134.

Figure 2:
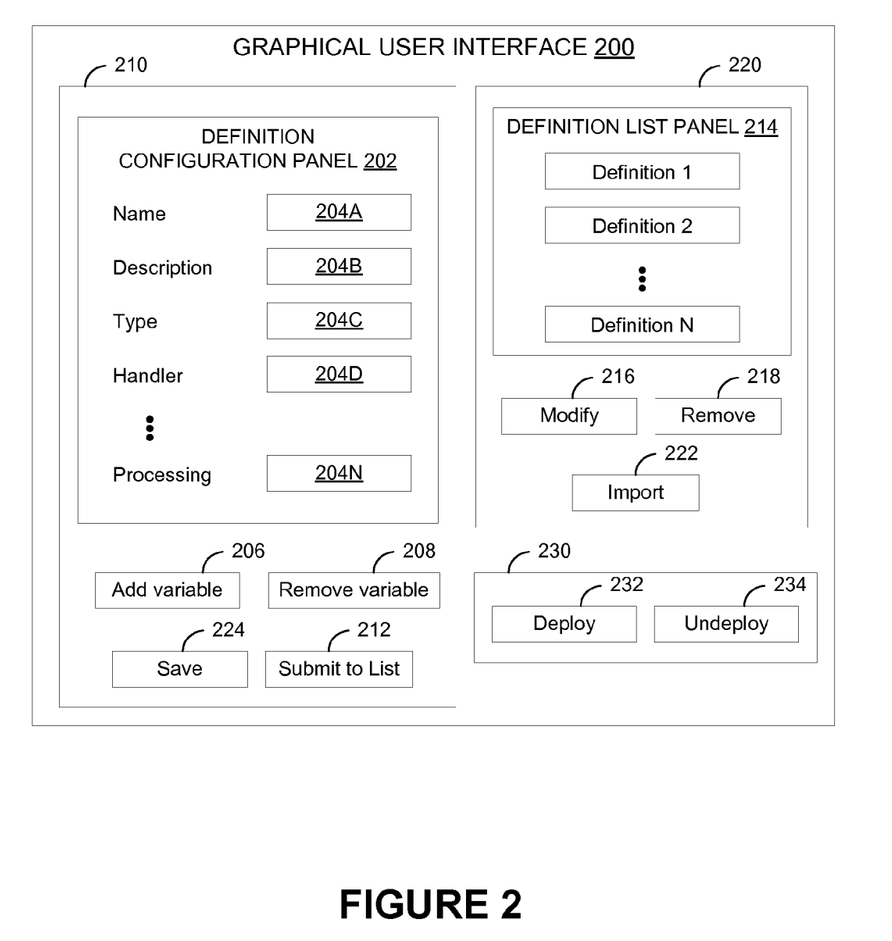
FIG. 2 illustrates an example of a user interface for creating definitions to aid processing of large data sets in computing systems, according to one embodiment.

FIG. 2 illustrates an example of a GUI 200, which can be used as the BDA user interface 112 described relative to FIG. 1, according to one embodiment. As shown, the GUI 200 includes, without limitation, a window 210, a window 220 and a window 230. Window 210 includes a definition configuration panel 202 that allows a user to create big data definitions. The definition configuration panel 202 includes various information fields 204A-N that allow a user to specify metadata (e.g., Name, Description, Type, Handler, . . . , Processing operations, etc.) associated with a big data definition. Using a credit card transaction as a reference example, a user can create (using the definition configuration panel 202) a big data definition to aid one or more applications in processing the credit card transaction. For example, a user can specify a "Name" (such as "CCTransactionData") for the big data definition in information field 204A, specify the "Description" (or what the big data definition will be used for, such as, for example, "process analytic features for incoming credit card transaction") in information field 204B, specify the "Type" of processing (such as, a transaction, etc.) for the big data definition in information field 204C, specify a "Handler" (such as "fraudDetectionFeatureSetup") for the big data definition in information field 204D, specify one or more processing analytics for the big data definition in information field 204N, and so on.

The window 210 also includes an "Add variable" button 206, a "Remove variable" button 208, a "Submit to List" button 212, and a "Save" button 224. The "Add variable" button 206 and the "Remove variable" button 208 allow a user to add and remove, respectively, information fields for metadata associated with the respective big data definition. The "Submit to List" button 212 allows a user to add a created big data definition to a definition list panel 214 (within window 220). Examples of additional metadata that can be encapsulated within a big data definition include, but are not limited to, memory resources (e.g., where to retrieve/store processing information for the big data definition), references (e.g., inputs, outputs, etc.) to other big data definitions, user defined parameters, thresholds, data mappings, labels, and other information that can be associated with processing of a transaction. The "Save" button 224 provides a user the option to save the information in information fields 204A-N to one or more configuration files. Allowing a user to add/remove/modify/save big data definitions in this manner provides extensibility, such that additional processing for a given transaction can be broken down to aid applications' in processing the respective transaction.

As shown, the definition list panel 214 (within window 220) illustrates to the user the list of big data definitions (e.g., Definition 1, Definition 2, . . . , Definition N) the user has created with the definition configuration panel 202. Window 220 includes a "Modify" button 216 and a "Remove" button 218, that allow a user to modify and remove, respectively, one or more big data definitions from the definition list panel 214. For example, in one embodiment, once a user selects the "Modify" button 216 (e.g., for Definition 1), the user can modify, in definition configuration panel 202, metadata associated with the selected big data definition. Window 220 also includes an "Import" button 222, which provides the user the option to import one or more big data definitions from configuration files, or other location.

Window 230 includes a "Deploy" button 232 and an "Undeploy" button 234. The "Deploy" button allows the user to make accessible, via the BDA tool 136, the re-usable software components (encapsulated by the big data definitions within the definition list panel 214) to the applications 134 processing a given transaction. Similarly, the "Undeploy" button 234 allows a user to remove (or reclaim) resources provided by the deployed big data definitions.

Note that the example GUI 200 illustrates one possible presentation of the information fields for the management and/or deployment of big data definitions. More generally, one of ordinary skill in the art will recognize that the GUI 200 may include different configurations of the information fields (e.g., with the same or different information) presented to a user.

Figure 3:
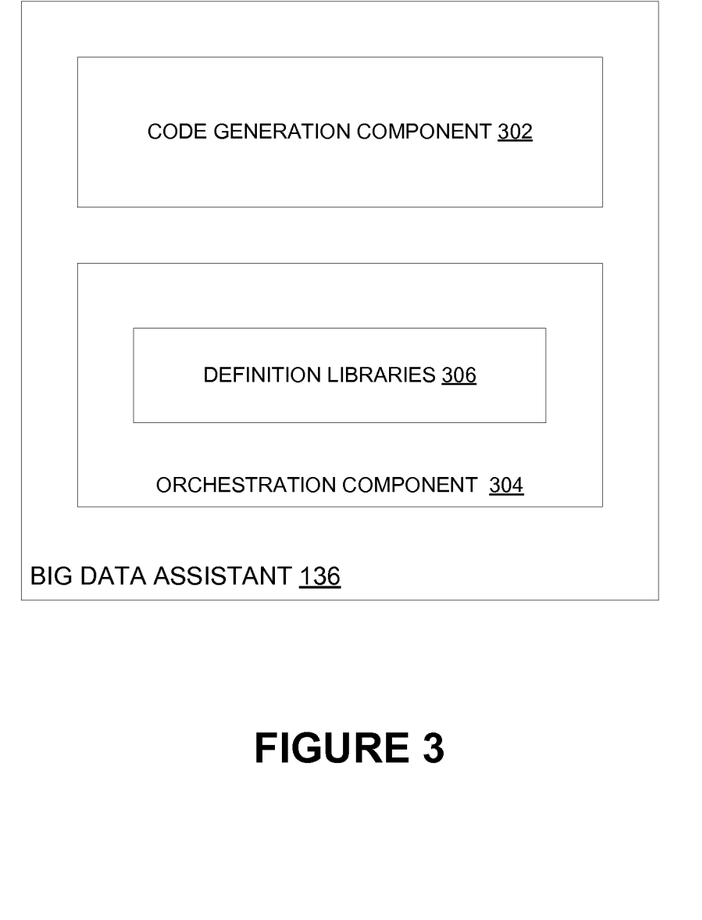
FIG. 3 illustrates a tool for orchestrating and deploying definitions to aid processing of large data sets in computing systems, according to one embodiment.

FIG. 3 further illustrates an example of the BDA tool 136 described relative to FIG. 1, according to one embodiment. As shown, the BDA tool 136 includes a code generation component 302 and an orchestration component 304. In one embodiment, once a user creates and deploys the big data definition (e.g., using the GUI 200), the BDA tool 136 receives the big data definitions, uses the code generation component 302 to generate executable code, and uses the orchestration component 304 to deploy (or make visible) the executable code to one or more applications 134, which may or may not be currently processing (or executing) a particular transaction.

In one embodiment, the code generation component 302 generates artifacts (e.g., source code) based on the software components encapsulated within the big data definitions. In one embodiment, the code generation component 302 uses a code generator based on Apache (e.g., such as Velocity, etc.) to generate the source code. However, in general, the code generation component 302 can use any code generation tool to generate the source code. Once the code generation component 302 generates the source code, the code generation component 302 compiles the source code and provides executable code to a staging directory.

In one embodiment, the orchestration component 304 deploys the executable code to definition libraries 306 (via production directories), which allows applications 136 to access resources (e.g., data, analytics information, etc.) within the libraries 306. Doing so in this manner allows the orchestration component 304 to deploy one or more big data definitions to the applications 134 without interrupting or suspending services provided by the applications 134. In one embodiment, the orchestration component 304 also allows a user to change values of one or more variables (e.g., such as user defined parameters), within a big data definition, instantaneously without re-deploying artifacts, such that applications 134 can immediately use the new values in real-time.

Figure 4:
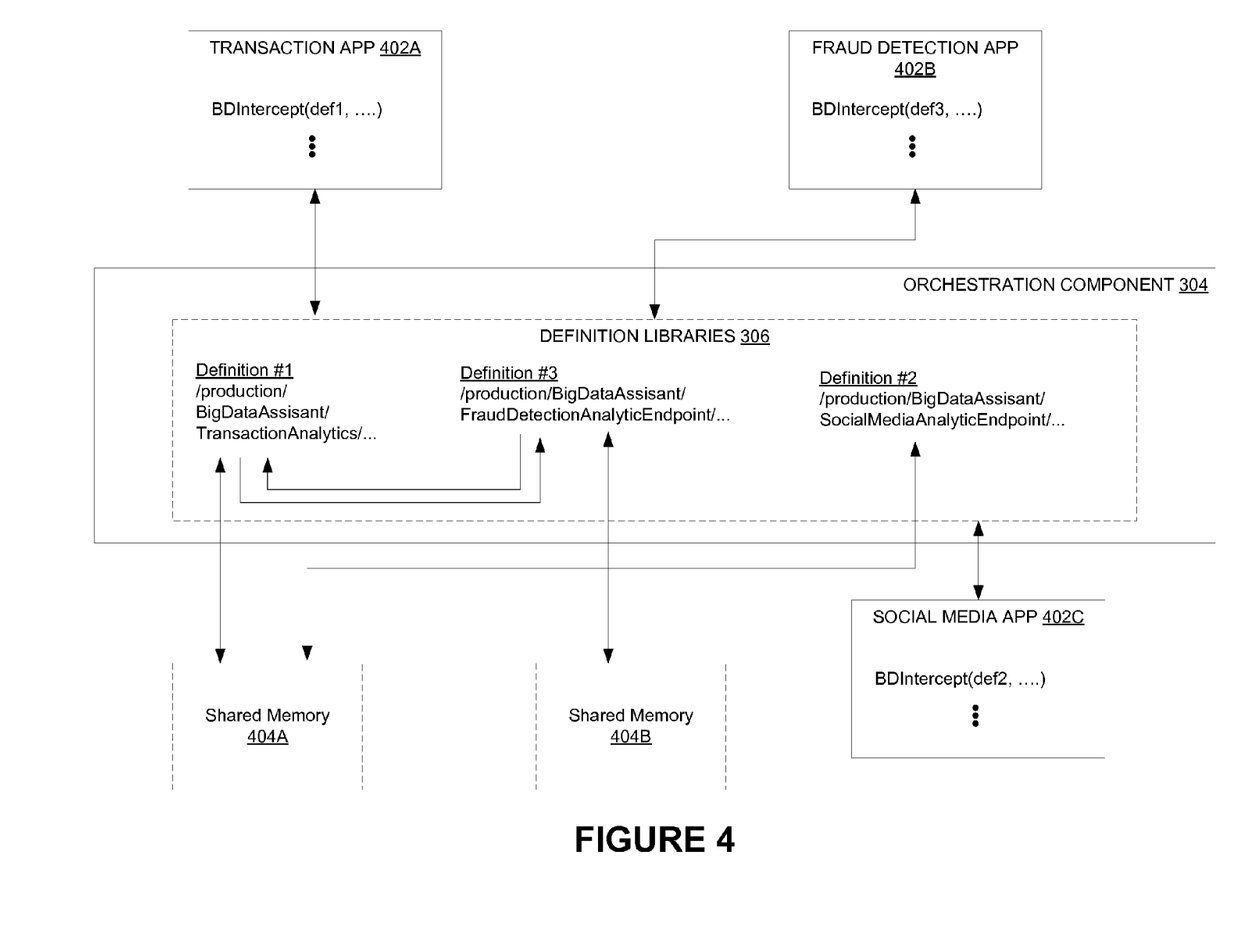
FIG. 4 illustrates an example deployment of one or more definitions to a plurality of applications within the computing system, according to one embodiment.

FIG. 4 illustrates an example deployment of one or more big data definitions to a plurality of applications within a computing system, according to one embodiment. As shown, the orchestration component 304 includes one or more big data definitions (e.g., definition #1, definition #2, definition #3) in definition libraries 306. The definitions #1-3 within the definition libraries 306 allow each of the applications 402A-C to share each other applications' analytics information, allowing the applications to perform data-intensive processing of a transaction in real-time.

In one embodiment, a user that wants an application to make use of the big data definitions provided by orchestration component 304 would simply code handlers (or big data intercepts) (e.g., once) within the existing applications, passing in records or other real-time input for the big data definition. The handlers represent the only update a user has to make to existing code to allow applications to use the processing provided by the big data definitions. As such, the techniques presented allow applications to perform data-intensive processing tasks without undergoing extensive development modifications or even new development.

In one embodiment, each big data intercept goes to the same definition libraries 306 where the big data definitions are deployed. Doing so in this manner allows applications 134 to perform various operations (e.g., pull, put, operate, store, etc.) and use various resources as defined by each respective definition, and allows other applications to do the generally the same with other definitions or the same definition. As shown, application 402A includes a handler (e.g., BDIntercept(def1, . . . )) to definition #1 in definition libraries 306; application 402B includes a handler (e.g., BDIntercept(def3, . . . )) to definition #3 in definition libraries 306; and application 402C includes a handler (e.g., BDIntercept(def2, . . . )) to definition #2 in definition libraries 306. Each handler within application 402A-C provides an entry point to the coordination provided by the orchestration component 304. For example, since all handler inputs are exposed transparently to other big data handlers, the orchestration component 304 is configured to provide a view of all data in motion to applications 134 performing same or different tasks. Further, as described below, the techniques presented herein allow a user to change processing associated with a big data definition without changing the underlying handler within each big data definition.

In one embodiment, one or more applications could be involved in processing a given transaction, such as a credit card transaction, or other real-time transactions. For example, transaction application 402A could be a legacy transaction application responsible for processing credit card transactions for one or more users. Additionally, in some cases, the processing of the credit card transaction could be influenced by additional applications, such as the fraud detection application 402B, and the social media application 402C. However, as mentioned above, traditional techniques generally are not capable of processing fraud detection information and social media information in real-time, but instead use batch processing techniques or resort to developing new applications in order to account for the additional processing information.

The techniques presented herein, however, allow the applications 402A-C to share analytics information, via one or more big data definitions (e.g., definitions #1-3) such that the fraud detection application 402B and social media application 402C can influence the processing of the credit card transaction (by the legacy transaction application 402A) in real-time. As shown, each user created definition (within the definition libraries 306) contains analytics information associated with processing of a credit card transaction. For example, definition #1 includes legacy transaction analytics information; definition #2 includes social media analytics information; and definition #3 includes fraud detection analytics information. In one embodiment, as part of the created big data definitions, a user can also specify the location, type, etc. of one or more resources (e.g., memory constructs, etc.) where each big data definition should put their respective analytics information. For example, as shown, definitions #1 and #2 have access to shared memory resource 404A, and definition #3 has access to shared memory resource 404B. Note that although, in this embodiment, shared memory is used as an example of the memory construct, in other embodiments, other memory constructs can also be used.

As shown in this embodiment, to influence processing of the transaction application 402A with fraud detection analytics information in real-time, a user creates definition #3 (with the fraud detection application) and specifies that definition #3 is a part of the input to definition #1, which contains the legacy transaction processing information. Once the orchestration component 304 deploys these definitions (e.g., by updating the libraries located at the production directories in definition libraries 306), the transaction application will be able to use the fraud detection analytics information (e.g., located in shared memory 404B) in real-time, without interrupting its services.

Alternatively, or additionally, as also shown, to influence processing of the transaction application 402A with social media analytics information in real-time, a user creates definition #2 (with the social media analytics information) and specifies that the social media analytics information should be stored in shared memory location 404A. As such, once the orchestration component 304 deploys definition #2, the transaction application 402A will have visibility to the social media analytics information contained in shared memory location 404A since definition #1 has visibility to shared memory location 404A. In other embodiments, a user could also specify that definition #2 is part of the input to definition #1 (or definition #3), which would also allow the transaction application 402A to use the social media analytics information in real-time, without interrupting or suspending services by the transaction application 402A. As such, the techniques presented herein achieve improved integration with other applications running at the same time. Further, the techniques presented herein allow for more complex processing (which may or may not be supported by a legacy application) to be added to processing of a given transaction.

In one embodiment, the orchestration component 304 uses constructors/deconstructors to deploy and undeploy, respectively, resources for one or more big data definitions. When undeploying big data definitions, use of destructors allows the last application referencing the particular big data definition to destroy and clean up any shared resources with other definitions. For example, in some cases, it is possible to un-deploy a first big data definition being called at one location of the transaction application without stopping the same transaction application from continuing to execute a second big data definition called at a second location of the transaction application.

Note, however, that FIG. 4 illustrates merely one possible deployment/scenario of one or more big data definitions to applications 134. For example, although only one big data intercept is illustrated in each application 404A-C, in general, there is not a limit to the number of intercepts that a user could place into each application. Further, although FIG. 4 illustrates only three applications, in general, the techniques presented herein can be provided to any number of applications that want to perform big data processing.

Figure 5:
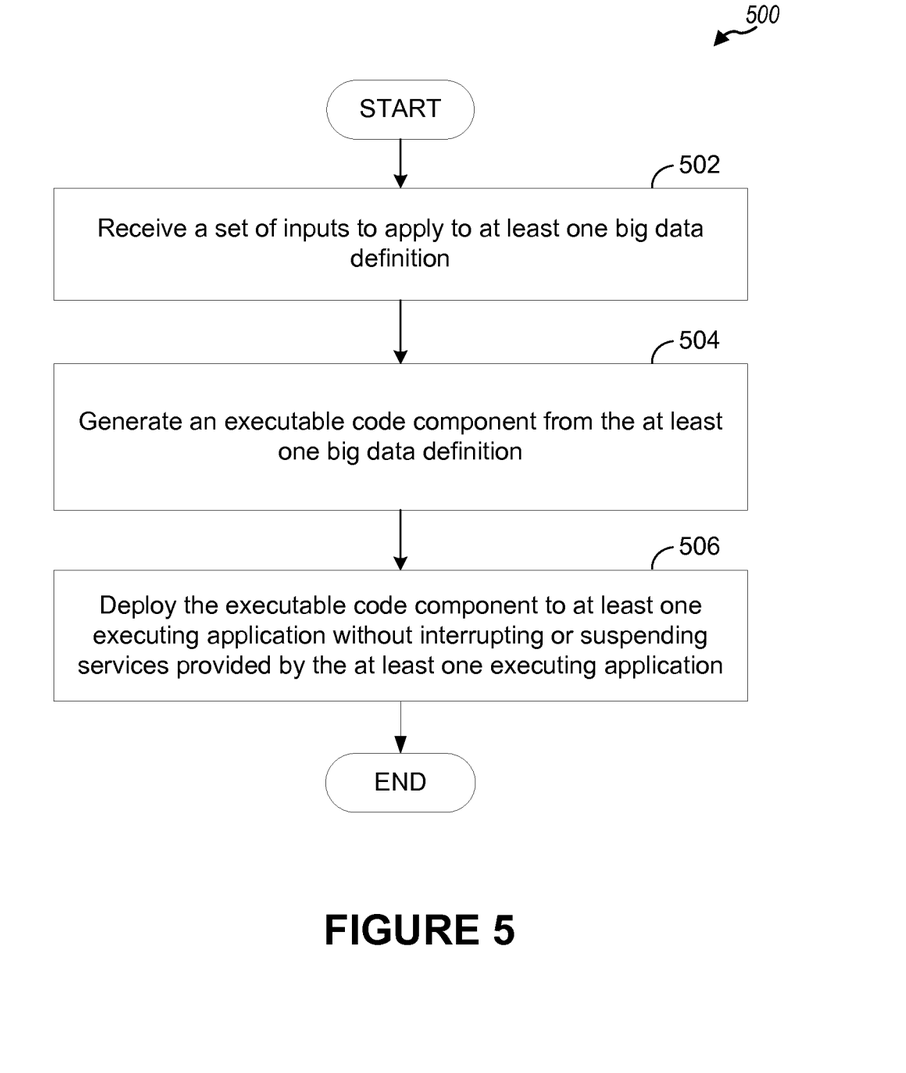
FIG. 5 illustrates a method for orchestrating data into definitions to aid processing of large data sets in computing systems, according to one embodiment.

FIG. 5 illustrates a method 500 for orchestrating data into definitions to aid processing of large data sets in computing systems, according to one embodiment. As shown, the method 500 begins at step 502, where the BDA tool 136 receives (via the BDA user interface 112) a set of inputs to apply to at least one big data definition. As mentioned above, each big data definition encapsulates information (e.g., metadata) specified in the set of inputs into a set of reusable software components. For example, in one embodiment, the set of inputs can include at least an output from a deployment of an executable code component generated from at least another big data definition. In one embodiment, the output of the executable code component, once deployed, is provided as an input to a deployment of an executable component generated from at least another big data definition.

At step 504, the BDA tool 136 generates (via the code generation component 3023) an executable code component based on the set of reusable software components within the at least one big data definition. At step 506, the BDA tool 136 (via the orchestration component 304) deploys the executable code component to a running executing application without interrupting or suspending services provided by the executing application to which the executable code component is deployed.

As such, embodiments presented herein allow applications to handle immense amounts of data and analytics information, which can be located across different applications and/or machines, in real-time without service interruption to any executing applications. Further, the techniques presented herein allow users to add processing capabilities (e.g., incorporate processing analytic features not previously represented in legacy code, change user defined parameters, add interactions with additional applications, etc.) without making extensive modifications to existing code and without undergoing the expensive process of developing and testing a new application. Further, the techniques presented herein can be used to generate code for any language and for any operating system, providing increased flexibility compared to traditional techniques.

Figure 6:
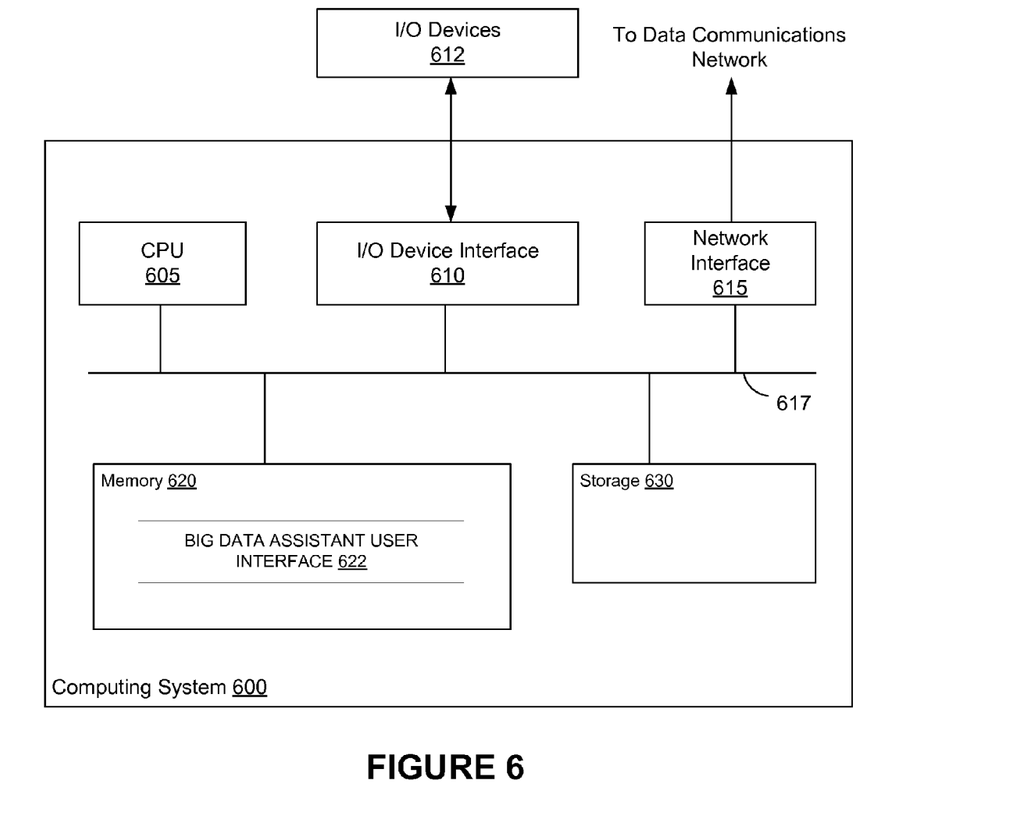
FIG. 6 illustrates a computing system configured to create big data definitions to aid processing of real-time transactions, according to one embodiment.

FIG. 6 illustrates a computing system 600 configured to create big data definitions to aid processing of real-time transactions, according to one embodiment. As shown, the computing system 600 includes, without limitation, a central processing unit (CPU) 605, a network interface 615, a memory 620, and storage 630, each connected to a bus 617. The computing system 600 may also include an I/O device interface 610 connecting I/O devices 612 (e.g., keyboard, mouse, and display devices) to the computing system 600. Further, in context of this disclosure, the computing elements shown in the computing system 600 may correspond to a physical computing system (e.g., a system in a data center) or may be a virtual computing instance executing within a computing cloud.

The CPU 605 retrieves and executes programming instructions stored in the memory 620 as well as stores and retrieves application data residing in the memory 620. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, the memory 620 includes a big data assistant user interface 622 (such as, e.g., a GUI) that allows a user to create big data definitions associated with processing a transaction. For example, in one embodiment, a user can specify metadata (e.g., such as inputs, outputs, data format, processing operations, memory resources, etc.) for one or more big data definitions and make the reusable software components encapsulated within the big data definitions available to one or more applications.

Figure 7:
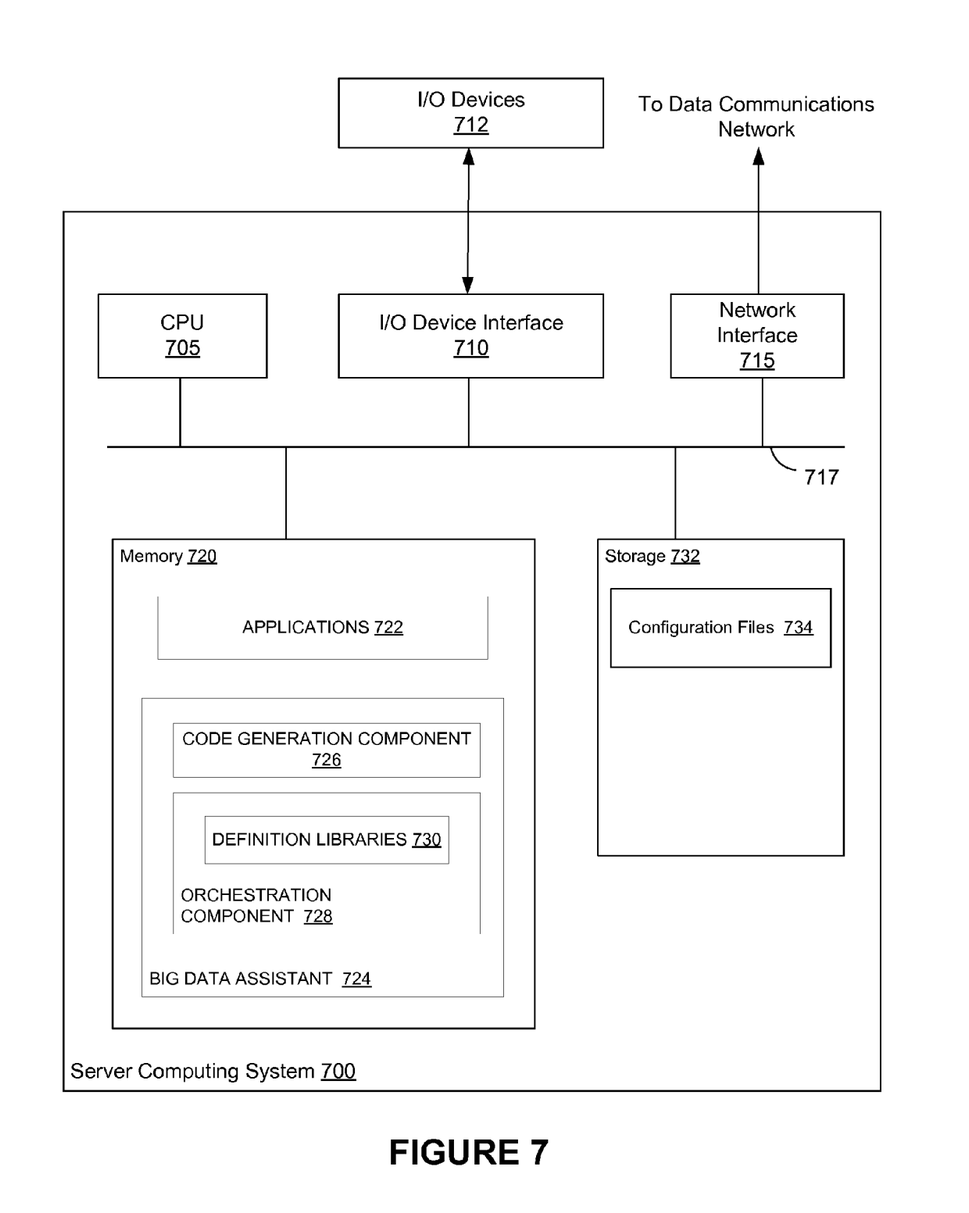
FIG. 7 illustrates a computing system configured to orchestrate and deploy definitions to aid processing of large data sets, according to one embodiment.

FIG. 7 illustrates a server computing system 700 configured to orchestrate and deploy one or more big data definitions to aid processing of a large data set, according to one embodiment. As shown, the computing system 700 includes, without limitation, a central processing unit (CPU) 705, a network interface 715, a memory 720, and storage 760, each connected to a bus 717. The computing system 700 may also include an I/O device interface 710 connecting I/O devices 712 (e.g., keyboard, mouse, and display devices) to the computing system 700. Further, in context of this disclosure, the computing elements shown in the computing system 700 may correspond to a physical computing system (e.g., a system in a data center) or may be a virtual computing instance executing within a computing cloud.

The CPU 705 retrieves and executes programming instructions stored in the memory 720 as well as stores and retrieves application data residing in the memory 720. The interconnect 717 is used to transmit programming instructions and application data between CPU 705, I/O devices interface 710, storage 760, network interface 715, and memory 720. Note, CPU 705 is included to be representative of a single CPU, multiple CPUs, a single CPU having multiple processing cores, and the like. Memory 720 is generally included to be representative of a random access memory. Storage 732 may be a disk drive storage device and may include server configuration files 734. Although shown as a single unit, storage 732 may be a combination of fixed and/or removable storage devices, such as fixed disc drives, removable memory cards, or optical storage, network attached storage (NAS), or a storage area-network (SAN).

Illustratively, the memory 720 includes applications 722 and a BDA tool 724. Applications 722 may be divided (or partitioned) among one or more logical partitions within memory 720. Similarly, BDA tool 724 may also be included in one of the logical partitions within memory 720. The BDA tool 724 includes a code generation component 726 and a orchestration component 728. In one embodiment, the code generation component 726 generates executable code, based on received re-usable software components, in each big data definition. In one embodiment, the orchestration component 728 deploys the executable code to definition libraries 730 (e.g., listed in production directories). Doing so in this manner allows applications 722 to access (share) data, analytics information, and other information provided by the big data definitions, without interrupting or suspending services provided by the applications 722.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a static random access memory (SRAM), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., the proxy service) or related data available in the cloud. For example, the proxy service could execute on a trusted computing system in a cloud and perform SAN disk management operations to disk units on behalf of a client of the SAN provider. In such a case, the proxy service could obtain client configuration information and store such information at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for orchestrating a collection of big data definitions used to build executable code for a high-performance computing application, the method comprising:
    receiving a set of inputs to apply to at least a first big data definition, wherein the set of inputs comprise one or more first processing operations to apply to an application executing a transaction based on one or more second processing operations and wherein each big data definition encapsulates information specified in the set of inputs into a set of reusable software components;
    generating, based on the reusable software components, a first executable code component for the at least first big data definition; and deploying the first executable code component to the executing application without interrupting or suspending services provided by the executing application to which the first executable code component is deployed, wherein, after deploying the first executable code component, the application executes the transaction based on the one or more first processing operations and the one or more second processing operations.

2. The method of claim 1, wherein the set of inputs further comprises at least an output from a deployment of a second executable code component generated from at least a second big data definition.

3. The method of claim 1, wherein an output of the first executable code component, once deployed, is provided as an input to a deployment of an executable code component generated from at least a second big data definition.

4. The method of claim 1, wherein the set of inputs further comprise at least one of one or more user-defined parameters or memory resources.

5. The method of claim 4, further comprising:
changing a value for one or more of the user-defined parameters, after deploying the first executable code component, without generating and deploying another executable code component.

6. The method of claim 3, further comprising undeploying the first executable code component from the executing application without interrupting the deployment of the executable code component generated from at least the second big data definition.

7. The method of claim 1, further comprising deploying the first executable code component to another application that is not currently processing a transaction.

8. A system, comprising:
a processor; and
a memory containing a program, which when executed on the processor, performs an operation for orchestrating a collection of big data definitions used to build executable code for a high-performance computing application, the operation comprising:
receiving a set of inputs to apply to at least a first big data definition, wherein the set of inputs comprise one or more first processing operations to apply to an application executing a transaction based on one or more second processing operations and wherein each big data definition encapsulates information specified in the set of inputs into a set of reusable software components;
generating, based on the reusable software components, a first executable code component for the at least first big data definition; and
deploying the first executable code component to the executing application without interrupting or suspending services provided by the executing application to which the first executable code component is deployed, wherein, after deploying the first executable code component, the application executes the transaction based on the one or more first processing operations and the one or more second processing operations.

9. The system of claim 8, wherein the set of inputs further comprises at least an output from a deployment of a second executable code component generated from at least a second big data definition.

10. The system of claim 8, wherein an output of the first executable code component, once deployed, is provided as an input to a deployment of an executable code component generated from at least a second big data definition.

11. The system of claim 8, wherein the set of inputs comprise at least one of one or more user-defined parameters or memory resources.

12. The system of claim 11, wherein the operation further comprises:
changing a value for one or more of the user-defined parameters, after deploying the first executable code component, without generating and deploying another executable code component.

13. The system of claim 10, wherein the operation further comprises undeploying the first executable code component from the executing application without interrupting the deployment of the executable code component generated from at least the second big data definition.

14. The system of claim 8, wherein the operation further comprises deploying the first executable code component to another application that is not currently processing a transaction.

15. A computer-readable storage medium storing instructions, which, when executed on a processor, perform an operation for orchestrating a collection of big data definitions used to build executable code for a high-performance computing application, the operation comprising:
receiving a set of inputs to apply to at least a first big data definition, wherein the set of inputs comprise one or more first processing operations to apply to an application executing a transaction based on one or more second processing operations and wherein each big data definition encapsulates information specified in the set of inputs into a set of reusable software components;
generating, based on the reusable software components, a first executable code component for the at least first big data definition; and
deploying the first executable code component to the executing application without interrupting or suspending services provided by the executing application to which the first executable code component is deployed, wherein, after deploying the first executable code component, the application executes the transaction based on the one or more first processing operations and the one or more second processing operations.

16. The computer-readable storage medium of claim 15, wherein the set of inputs further comprises at least an output from a deployment of a second executable code component generated from at least a second big data definition.

17. The computer-readable storage medium of claim 15, wherein an output of the first executable code component, once deployed, is provided as an input to a deployment of an executable code component generated from at least a second big data definition.

18. The computer-readable storage medium of claim 15, wherein the set of inputs further comprise at least one of one or more user-defined parameters or memory resources.

19. The computer-readable storage medium of claim 18, wherein the operation further comprises changing a value for one or more of the user-defined parameters, after deploying the first executable code component, without generating and deploying another executable code component.

20. The computer-readable storage medium of claim 15, wherein the operation further comprises deploying the first executable code component to another application that is not currently processing a transaction.

* * * * *